US008732684B2

(12) United States Patent
Tojo et al.

(10) Patent No.: US 8,732,684 B2
(45) Date of Patent: May 20, 2014

(54) PROGRAM CONVERSION APPARATUS AND COMPUTER READABLE MEDIUM

(75) Inventors: Nobuaki Tojo, Tokyo (JP); Ken Tanabe, Tokyo (JP); Hidenori Matsuzaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 532 days.

(21) Appl. No.: 13/013,450

(22) Filed: Jan. 25, 2011

(65) Prior Publication Data

US 2012/0042304 A1 Feb. 16, 2012

(30) Foreign Application Priority Data

Aug. 10, 2010 (JP) ................................ P2010-179830

(51) Int. Cl.
*G06F 9/45* (2006.01)

(52) U.S. Cl.
USPC ........... 717/149; 717/142; 717/143; 717/154; 717/159

(58) Field of Classification Search
None
See application file for complete search history.

(56) References Cited

U.S. PATENT DOCUMENTS

| 6,031,994 | A  | * | 2/2000  | Radigan ......................... 717/152 |
| 6,367,067 | B1 | * | 4/2002  | Odani et al. ................... 717/154 |
| 6,438,745 | B1 | * | 8/2002  | Kanamaru et al. ............. 717/137 |
| 6,862,729 | B1 |   | 3/2005  | Kuch et al. |
| 6,931,635 | B2 | * | 8/2005  | Inagaki et al. ................. 717/157 |
| 7,577,936 | B2 | * | 8/2009  | Koseki et al. .................. 717/108 |
| 7,770,163 | B2 | * | 8/2010  | Stoodley et al. ............... 717/158 |
| 7,882,498 | B2 | * | 2/2011  | Ottoni et al. ................... 717/149 |
| 8,151,252 | B2 | * | 4/2012  | Song et al. ..................... 717/140 |
| 8,286,145 | B2 | * | 10/2012 | Kawabata et al. ............. 717/136 |
| 8,458,680 | B2 | * | 6/2013  | Crutchfield et al. ........... 717/149 |
| 2002/0056078 | A1 | * | 5/2002 | Inagaki et al. ................. 717/155 |
| 2004/0194071 | A1 | * | 9/2004 | Tanaka ........................... 717/136 |
| 2005/0257200 | A1 | * | 11/2005 | Taylor ............................ 717/136 |
| 2006/0277532 | A1 | * | 12/2006 | Barraclough et al. ......... 717/137 |
| 2007/0022409 | A1 | * | 1/2007  | Levenshteyn ................. 717/136 |
| 2007/0174829 | A1 |   | 7/2007  | Brockmeyer et al. |
| 2007/0226683 | A1 | * | 9/2007  | Stoodley et al. .............. 717/106 |
| 2007/0294680 | A1 | * | 12/2007 | Papakipos et al. ............ 717/149 |
| 2007/0294681 | A1 | * | 12/2007 | Tuck et al. ..................... 717/149 |

(Continued)

OTHER PUBLICATIONS

Song et al., Design and Implementation of a Compiler Framework for Helper Threading on Multi-Core Processors, published by IEEE, 2005, pp. 1-11.*

(Continued)

*Primary Examiner* — Tuan Q. Dam
*Assistant Examiner* — Zheng Wei
(74) *Attorney, Agent, or Firm* — Finnegan, Henderson, Farabow, Garrett & Dunner, L.L.P.

(57) ABSTRACT

According to one embodiment, a first program code including a plurality of variables is converted to a second program code to be executed by a multi-core processor including a plurality of cores. Specifically, an access pattern of each variable in the first program code is decided. All variables in the first program code are classified into a plurality of groups each of which variables belong to the same access pattern. A member structure of each group having variables belonging to the same access pattern is created. Each member structure includes variables of one group. A route-pointer indicating an address (in a memory) of variables of the member structure is created. The variables in the first program code are converted to the member structure and the route-pointer (in the second program code) that indicate the variables. The second program code is outputted to the multi-core processor.

15 Claims, 16 Drawing Sheets

(56) References Cited

U.S. PATENT DOCUMENTS

| | | | |
|---|---|---|---|
| 2007/0300210 A1* | 12/2007 | Haraguchi | 717/136 |
| 2008/0034357 A1* | 2/2008 | Gschwind | 717/149 |
| 2008/0288923 A1* | 11/2008 | Shimogori | 717/125 |
| 2008/0295082 A1* | 11/2008 | Kawabata et al. | 717/136 |
| 2009/0187895 A1* | 7/2009 | Mineo | 717/136 |
| 2009/0217253 A1* | 8/2009 | Song et al. | 717/161 |
| 2009/0259996 A1* | 10/2009 | Grover et al. | 717/136 |
| 2009/0259997 A1* | 10/2009 | Grover et al. | 717/136 |
| 2009/0313612 A1* | 12/2009 | Vick et al. | 717/136 |
| 2011/0083125 A1* | 4/2011 | Komatsu et al. | 717/149 |
| 2011/0265068 A1* | 10/2011 | Elnozahy et al. | 717/149 |

OTHER PUBLICATIONS

Wang et al., EXOCHI: Architecture and Programming Environment for a Heterogeneous Multi-core Mulitthreaded System, published by ACM, 2007, pp. 156-166.*

Dolbeau et al., HMPP: A Hybrid Mutlit-core Parallel Programming Environment, publisher unknown, published in 2007, pp. 1-5.*

* cited by examiner

```
int main(int argc, char *argv[]) {
    char local_array[10] = {3, 8, 1, 2, 0, 9, 7, 5, 6, 4};
    int i;
    long result;

if(argc != 3) {
        printf("error!!\n");
        return -1;
    }

Struct_A.data1 = argv[1];
    data2 = argv[2];
    Struct_A.p1 = local_array;

for(i = 0; i < 10; i++) {
        thread_A();
        thread_B();
        thread_C();
    } for(i = 0; i < 10; i++) {
        result = result + Struct_A.array1[i];
    } printf("result:%ld\n", result);

return 0;
} struct A {
    int array1[10];
    long array2[30];
    int data1;
    char *p1;
};

struct A Struct_A;
char array3[10];
char data2;
```

FIG. 4

```
void thread_A() {
    int i,j;
    for(i = 0; i < 10; i++) {
        Struct_A.array1[i] = *(Struct_A.p1) + i;
        array3[i] = data2 * i;
        Struct_A.p1++;
    }
    for(j = 0; j < 30; j++) {
        Struct_A.array2[j] = Struct_A.data1 * j + array3[j % 10];
    }
} void thread_B() {
    int i;
    for(i = 0; i < 10; i++) {
        Struct_A.array1[i] = (Struct_A.array1[i] + Struct_A.array2[i] + Struct_A.array2[i+10]
            + Struct_A.array2[i+20]) * (Struct_A.data1 + data2);
    }
} void thread_C() {
    int i;
    for(i = 0; i < 10; i++) {
        Struct_A.array1[i] = Struct_A.array1[i] - data2;
    }
}
```

```
struct patternA {
    char array3[10];
    char *p1;
};
struct patternB {
    long array2[30];
    int data1;
};
struct patternC {
    int array1[10];
    char data2;
};

struct patternA pA;
struct patternB pB;
struct patternC pC;
struct patternA *p_a;
struct patternB *p_b;
struct patternC *p_c;

p_a = *pA;
p_b = *pB;
p_c = *pC;

int main(int argc, char *argv[]) {
    char local_array[10] = {3, 8, 1, 2, 0, 9, 7, 5, 6, 4};
    int i;
    long result;

if(argc != 3) {
        printf("error!!\n");
        return -1;
    } p_b->data1 = argv[1];
    p_a->data2 = argv[2];
    p_a->p1 = local_array;

for(i = 0; i < 10; i++) {
        thread_A();
        thread_B();
        thread_C();
    } for(i = 0; i < 10; i++) {
        result = result + p_c->array1[i];
    } printf("result:%ld\n", result);

return 0;
}
```

FIG. 7

```
void thread_A() {
  int i,j;
  for(i = 0; i < 10; i++) {
    p_c->array1[i] = *(p_a-> p1) + i;
    p_a-> array3[i] = p_c-> data2 * i;
    p_a->p1++;
  }
  for(j = 0; j < 30; j++) {
    p_b->array2[j] = p_b-> data1 * j + p_a-> array3[j % 10];
  }
} void thread_B() {
  int i;
  for(i = 0; i < 10; i++) {
    p_c-> array1[i] = (p_c-> array1[i] + p_b-> array2[i] + p_b-> array2[i+10]
    + p_b-> array2[i+20]) * (p_b-> data1 + p_c-> data2);
  }
} void thread_C() {
  int i;
  for(i = 0; i < 10; i++) {
    p_c-> array1[i] = p_c-> array1[i] - p_c-> data2;
  }
}
```

FIG. 8

```
int array[100];

int main() {
. . .
} void thread_1() {
. . .
memchange_mem2tomem1(array,(sizeof(int)*100));
(PROCESSING OF "array")
memchange_mem1tomem2(array ,(sizeof(int)*100));
. . .
} void thread_2() {
. . .
memchange_mem2tomem1(array ,(sizeof(int)*100));
(PROCESSING OF "array")
memchange_mem1tomem2(array ,(sizeof(int)*100));
. . .
}
```

FIG. 14

SCRATCH PAD MEMORY          CACHE MEMORY

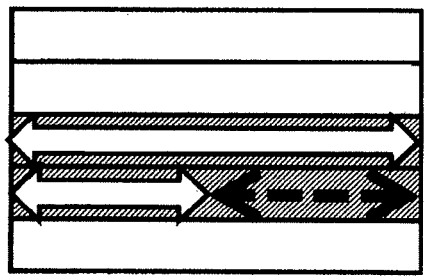
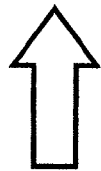
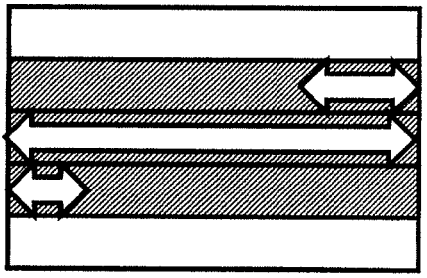
FIG. 16A
```
. . .
int array[100];
. . .
align(array);
. . .
```
FIG. 16B

PROGRAM CONVERSION APPARATUS AND COMPUTER READABLE MEDIUM

CROSS-REFERENCE TO RELATED APPLICATION

This application is based upon and claims the benefit of priority from Japanese Patent Application No. 2010-179830, filed on Aug. 10, 2010; the entire contents of which are incorporated herein by reference.

FIELD

Embodiments described herein relate generally to an apparatus for converting a program executed by a multi-core processor.

BACKGROUND

As to an architecture using a scratch pad memory, a technique related to an memory-optimization is disclosed (For example, US-A 20070174829 . . . Patent reference 1). In this technique, based on a profile result of an application program, data to be used is copied from a main memory to the scratch pad memory. However, this technique disclosed in the patent reference 1 cannot be applied to the cache memory.

Furthermore, as to an architecture using the cache memory, a technique to execute the memory-optimization is disclosed (For example, U.S. Pat. No. 6,862,729 . . . Patent reference 2). In this technique, Object members of an application program to be executed are classified into a plurality of groups, and Object members belonging to the same group are located at near position on the memory. However, this technique disclosed in the patent reference 2 cannot be applied to a multi-core processor in which each core has its own memory.

BRIEF DESCRIPTION OF THE DRAWINGS

FIG. 4 is one example of the pre-conversion program code.

FIG. 5 is functions of the example code of FIG. 4.

FIG. 6 is one example of profile information.

FIG. 7 is one example of the post-conversion program code.

FIG. 8 is functions of the example code of FIG. 7.

FIG. 14 is one example of codes to change the access property.

FIGS. 16A and 16B are schematic diagrams showing change of the cache memory by a program code for alignment.

DETAILED DESCRIPTION

Figure 1:
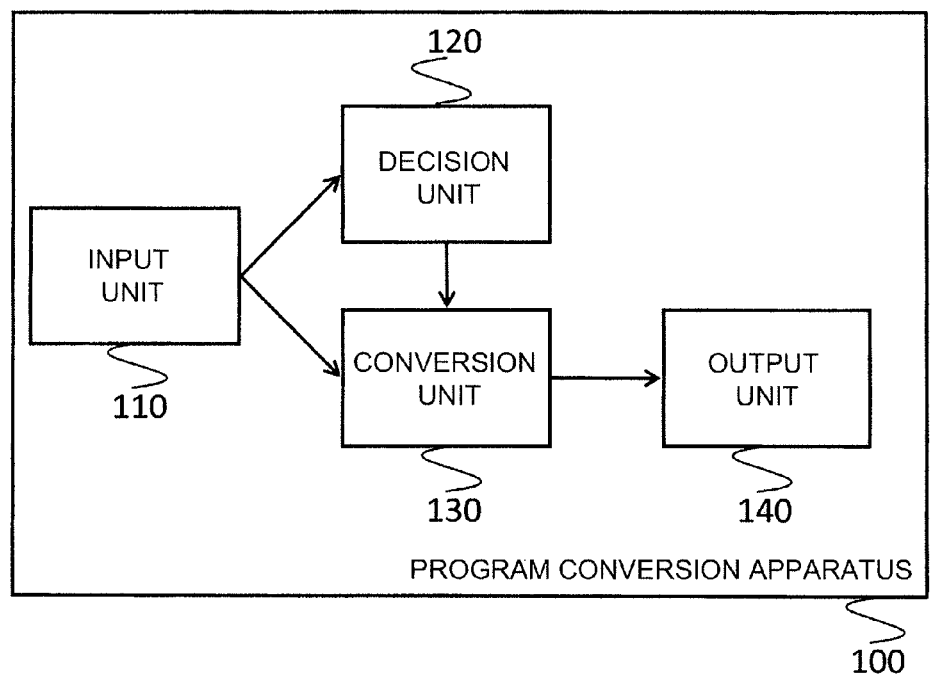
FIG. 1 is a block diagram of a program conversion apparatus according to a first embodiment.

In general, according to one embodiment, an apparatus converts a first program code to a second program code. The first program code includes a plurality of variables. The second program code is executed by a processor including a plurality of cores. The apparatus includes a decision unit and a conversion unit. The decision unit is configured to decide an access pattern of each variable by the processor. The conversion unit is configured to convert the first program code to the second program code including a plurality of threads. Each thread is executed by one of the plurality of cores. The second program code includes, (a) a first member structure including variables decided as a first access pattern, (b) a first route-pointer indicating the first member structure, the first route-pointer having a first access property representing accessibility by a core to execute a first thread, (c) a second member structure including variables decided as a second access pattern, (d) a second route-pointer indicating the second member structure, the second route-pointer having a second access property representing accessibility by the core to execute the first thread and a core to execute a second thread.

Hereinafter, embodiments of the present invention will be explained by referring to the drawings. The present invention is not limited to the following embodiments.

The First Embodiment

In FIG. 1, a program conversion apparatus 100 converts a program code having a plurality of variables to another program code to be executed by a processor (a multi-core processor, or a many processor) having a plurality of cores. The program conversion apparatus 100 includes an input unit 110, a decision unit 120, a conversion unit 130, and an output unit 140. One of these functional blocks (the input unit 110, the decision unit 120, the conversion unit 130, and the output unit 140) may be operated in cooperation with another of these functional blocks. One functional block may be divided into a plurality of functional blocks. Processing order of each functional block (related to following explanation) may be changed.

Figure 2:
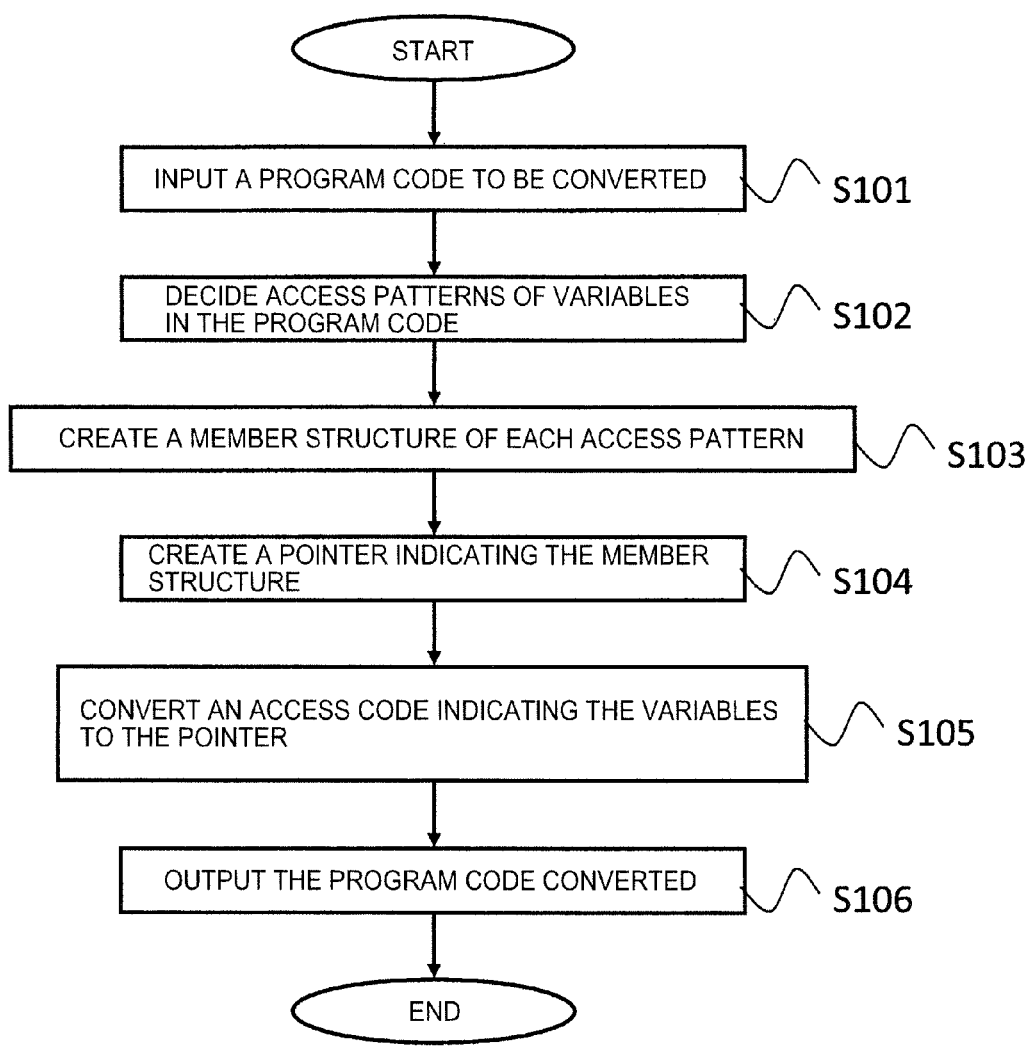
FIG. 2 is a flow chart of processing of the program conversion apparatus.

In FIG. 2, first, a program code (pre-conversion program code) as a conversion object is input to the input unit 110 (S101). The input unit 110 may input profile information of each variable to execute the pre-conversion program code.

Next, the decision unit 120 decides an access pattern of each variable (included in the pre-conversion program code) by the processor (S102). The decision unit 120 classifies all variables (included in the pre-conversion program code) into a plurality of groups each belonging to the same access pattern.

Next, the conversion unit 130 creates a member structure of each group of variables classified by the access pattern (S103). The member structure differently includes a group of variables. Next, the conversion unit 130 creates a pointer (route-pointer) indicating each member structure (S104). Next, the conversion unit 130 converts a code of variables (included in the pre-conversion program code) to another code indicating the variables with the route-pointer and the member structure.

Next, the output unit 140 outputs a program code (post-conversion program code) converted by the conversion unit 130 (S206).

As mentioned-above, the pre-conversion program code (input from the input unit 110) is converted by the decision unit 120 and the conversion unit 130, and output as the post-conversion program code from the output unit 140. In response to an intermediate progress or a processing result from the decision unit 120 or the conversion unit 130, decision/conversion processing with different method may be executed again by a user's instruction. Hereinafter, detail processing of each functional block is explained.

As shown in FIGS. 4 and 5, the input unit 110 inputs the pre-conversion program code. The pre-conversion program code (source program) may be a programming language such as C language or Java (registered trade mark) language, or an original programming language by a specified processor. As to the pre-conversion program code, all information (a plurality of variables, a definition of operation for each variable) need not be included in one file, and may be divisionally included in a plurality of files.

If the program code is in an executable state by the program conversion apparatus 100, any input method may be applied to the input unit 110. The input unit 110 may input using a file system of OS (Operating System), or may input information stored in a memory via a network. Furthermore, the input unit 110 may input a program code installed in the program conversion apparatus 100, or may interactively input by the user.

The input unit 110 may input profile information of the pre-conversion program code. The profile information may be any information to access each variable by the processor in case of executing the pre-conversion program code. The profile information includes at least the number of accesses of each variable included in the program code. Furthermore, the profile information may include various information such as timing to access the memory, an address of the memory to be accessed by the processor, a time required for the processor to access the memory, read or write as the processor's access, a thread number (which thread has accessed), and a core number (which core has accessed).

As shown in FIG. 6, the profile information includes, for each memory access by the processor, the number of cycles (timing of memory access represents which cycle from execution start of the program), an address used for memory access, either read (R) or write (W), and a thread number (which thread has accessed).

As to "15 0012 R 3", a third thread executes read processing of variables stored on address "0012" at the fifteenth cycle from execution start of the program. As to "37 1925 W 2", a second thread executes write processing to variables stored on address "1925" at the thirty-seventh cycle from execution start of the program.

If the profile information includes data used by the decision unit 120 and the conversion unit 130, this information need not be generated by a profile information generation apparatus exclusively used for the program conversion apparatus 100, and may be generated by the profile information generation apparatus for general purpose or another apparatus.

As to the profile information, all information need not be included in one file, and may be divisionally included in a plurality of files. When the profile information has erroneous data, each variable is possibly classified into erroneous access pattern. In order to avoid this problem, variables as decision object of access pattern may be previously indicated by a user. The variables (indicated by the user) as decision object of access pattern may be global variables in the pre-conversion program code. Furthermore, the variables may be static variables, constants, or local variables accessed by a specified thread. As a method for indicating variables as decision object of access pattern, the variables may be selected from a list (which may be output from the decision unit 120) of all variables included in the pre-conversion program code. Furthermore, the variables may be indicated based on a file (which may be input from the input unit 110, or may be stored in the decision unit 120) describing variables of decision objects of access pattern.

The decision unit 120 decides an access pattern of each variable included in the pre-conversion program code, and classifies variables into each access pattern. If the access pattern represents how to access each variable by the processor, the access pattern may be any pattern. For example, access patterns are classified into variables to be read only and variables to be written (update).

The decision unit 120 may statistically decide access patterns of variables using the program code. Furthermore, the decision unit 120 may dynamically decide access patterns of variables using an execution result (such as profile information) of the program code.

The access patterns may be classified into variables to be read only, variables to be written (update) only, and variables to be read and written. The access patterns may be classified based on a type (such as an integer type, a floating point type) of variables. The access pattern may be classified by that, which function in the program code includes variables, or a plurality of functions in the program code calls variables.

The access patterns may be classified into variables to be accessed by only a core executing a first thread, variables to be accessed by only a core executing a second thread, and variables to be accessed by both a core executing the first thread and a core executing the second thread. The access patterns may be classified into variables not to be simultaneously accessed by the core executing the first thread and the core executing the second thread, and variables to be simultaneously accessed by the core executing the first thread and the core executing the second thread. In case of statistically determining a core executing each thread, the access patterns may be classified into variables to be accessed by a first core, variables to be accessed by a second core, and variables to be accessed by the first core and the second core. The access patterns may be classified into variables not to be simultaneously accessed by a plurality of cores, and variables to be simultaneously accessed by the plurality of cores.

The access patterns may be classified into whether to operate variables, or frequency of operations (moving between core stored memories, moving between a core stored memory and a memory commonly used by a plurality of cores, moving between a memory commonly used by a plurality of cores and a memory commonly used by all cores). The access patterns may be classified based on timing to operate variables. Furthermore, the access patterns may be classified based on data included in profile information. In order to classify access patterns, a part of (above-mentioned) each classification method may be used, or a plurality of classification methods may be combined.

A method for deciding access patterns (by the decision unit 120) may be previously determined, or stored in the program conversion apparatus 100. Furthermore, the method may be input by the user via the input unit 110, or determined from the outside via a network.

Hereinafter, an operation example of the decision unit 120 is explained. In this example, among cores respectively executing threads A, B and C, access patterns are classified into variables to be accessed by which (at least one) core.

Figure 3:
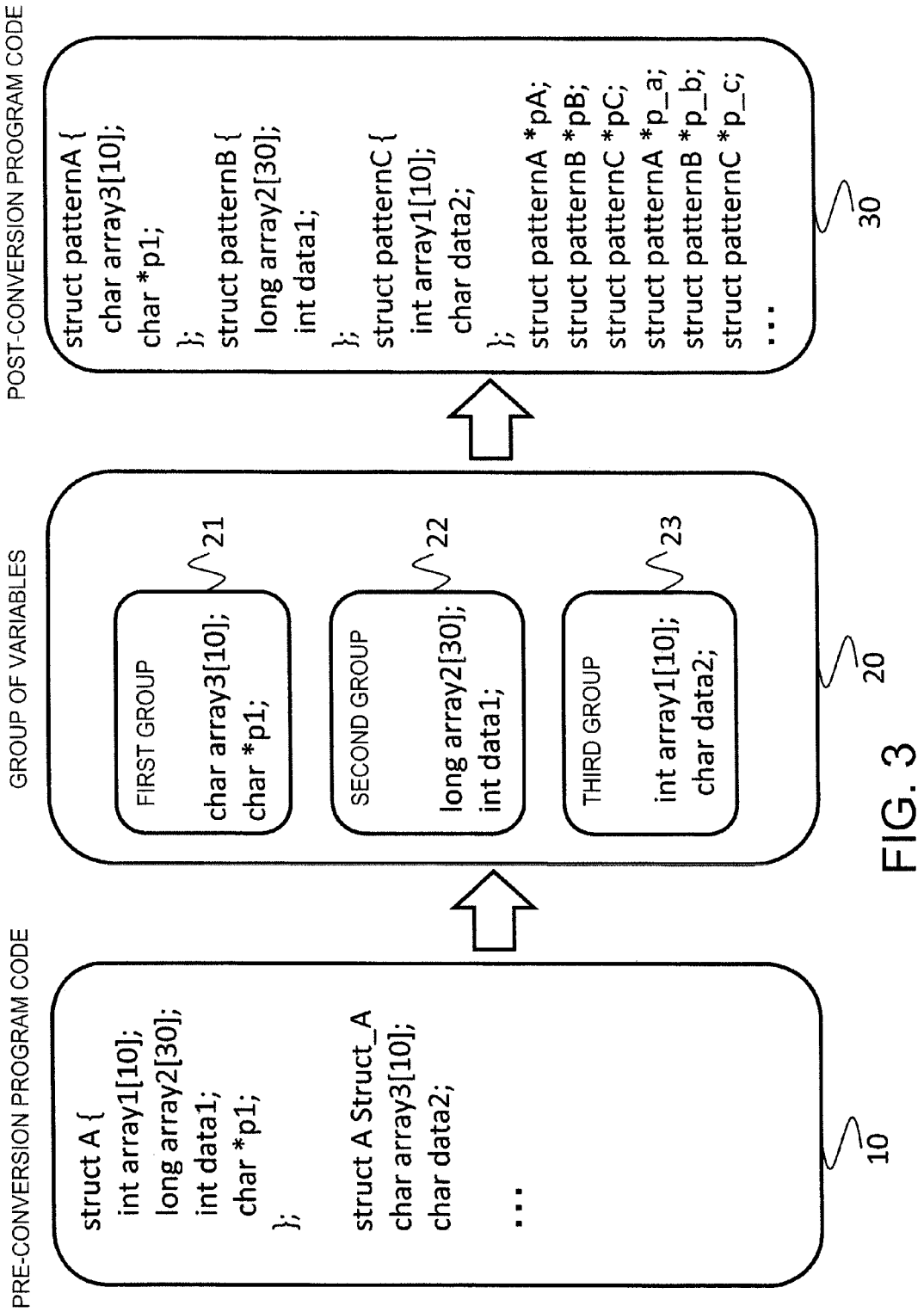
FIG. 3 is examples of a pre-conversion program code and a post-conversion program code.

In a pre-conversion program code of FIGS. 3, 4 and 5, the decision unit 120 decides access patterns of variables included in the pre-conversion program code, and groups the variables by each access pattern. The decision unit 120 acquires information necessary to decide the access pattern from the pre-conversion program code or the profile information. Hereinafter, by watching threads, the decision unit 120 acquires information representing which data is accessed by each thread. However, information to be acquired is not limited to above-mentioned information. For example, the decision unit 120 may acquire information such as, data to be read only, data to be written only, and data to be read and written.

Furthermore, the decision unit 120 may acquire information of function in the pre-conversion program code. Furthermore, the decision unit 120 may acquire information of data type such as an integer type or a floating point type. The decision unit 120 may acquire time information to access the memory, or information representing which core possibly accesses first. Furthermore, at least one of above-mentioned methods may be combined.

FIG. 3 shows a data structure of variables included in the pre-conversion program code. FIG. 4 shows codes defining parts of main functions and global declarations included in the pre-conversion program code. FIG. 5 shows codes of each thread included in the pre-conversion program code. A function "thread_A" represents a code (as thread A) to be executed by a core, a function "thread_B" represents a code (as thread B) to be executed by a core, a function "thread_C" represents a code (as thread C) to be executed by a core.

The core to execute thread A accesses all variables "array1, array2, array3, data1, data2, p1" included in the pre-conversion program code of FIG. 3. The core to execute thread B accesses "array1, array2, data1, data2" among the all variables included in the pre-conversion program code of FIG. 3. The core to execute thread C accesses "array1 and data2" among the all variables included in the pre-conversion program code of FIG. 3.

The decision unit 120 decides variables "array3, p1" (first group 21) to be accessed by a core to execute thread A, as a first access pattern. The decision unit 120 decides variables "array2, data1" (second group 22) to be accessed by cores to execute thread A and thread B, as a second access pattern. The decision unit 120 decides variables "array1, data2" (third group 23) to be accessed by cores to execute thread A, thread B and thread C, as a third access pattern. Moreover, a type of access patterns decided by the decision unit 120 is not limited to above three patterns, and may be any of above three patterns. The decision unit 120 sends the pre-conversion program code and access patterns of variables (belonging to which group) included in the pre-conversion program code, to the conversion unit 130. Furthermore, the decision unit 120 may send profile information to the conversion unit 130.

The conversion unit 130 converts the pre-conversion program code to a post-conversion program code (easy for memory-optimization) using access patterns of variables included in the pre-conversion program code. In case of converting the program code, the conversion unit 130 may use profile information. The conversion unit 130 converts the pre-conversion program code (10 in FIG. 3, and FIGS. 4 and 5) to the post-conversion program code (30 in FIG. 3, and FIGS. 7 and 8).

First, the conversion unit 130 creates a member structure for each group of variables classified by access patterns. The member structure includes a group of variables decided to be the same access pattern. At least one variable included in the member structure is stored in a continuous region of the memory. For example, the member structure is a structure of C language, or a class of Java language. The conversion unit 130 creates a pattern A structure having variables "array3, p1" of the first group 21, a pattern B structure having variables "array2, data1" of the second group 22, a pattern C structure having variables "array1, data2" of the third group 23.

Next, the conversion unit 130 creates a pointer (route-pointer) indicating each member structure. The route-pointer may be anything which indicates an address of member structure. For example, the route-pointer is a pointer of C language, or a reference of Java language. The conversion unit 130 creates a route-pointer "struct patternA pA(=struct patternA*p_a)" indicating the pattern A structure, a route-pointer "struct patternB pB(=struct patternB*p_b)" indicating the pattern B structure, and a route-pointer "struct patternC pC(=struct patternC*p_c)" indicating the pattern C structure.

Next, the conversion unit 130 extracts codes defining access to variables (members) included in the member structure, from the pre-conversion program code. Then, the conversion unit 130 converts the codes ("array1, array2, array3, data1, data2, p1") to other codes ("p_c→array1, p_b→array2, p_a→array3, p_b→data1, p_c→data2, p_a→p1") defining access to the member structure. Briefly, the conversion unit 130 converts the pre-conversion program code shown in FIGS. 4 and 5 to the post-conversion program code shown in FIGS. 7 and 8.

In above-mentioned example, a member structure and a route-pointer are declared as global variables, and code to access variables included in the member structure via the route-pointer is created. However, conversion processing is not limited to the above-mentioned example. The conversion unit 130 may declare a member structure and a route-pointer by a predetermined function in the post-conversion program code, and convert another function to codes to supply by arguments. The conversion unit 130 may create codes to define a structure having a route-pointer as a member. Furthermore, by hierarchically composing the member structures, the conversion unit 130 may create codes to define each member of a higher level member structure including a route-pointer of a lower level member structure.

The output unit 140 outputs a source program (converted by the conversion unit 130) from the program conversion apparatus 100. The post-conversion program code may be programming language such as C language or Java language, or a programming language of specified processor's own. As to the post-conversion program code, all information need not be included in one file, and may be divisionally included in a plurality of files. Languages of the pre-conversion program code and the post-conversion program code may be same or different.

If the post-conversion program code is in an executable condition by the processor, the output unit 140 may utilize any method for outputting. The output unit 140 may output using a file system of OS, via a network, or using GUI interactively.

Figure 9:
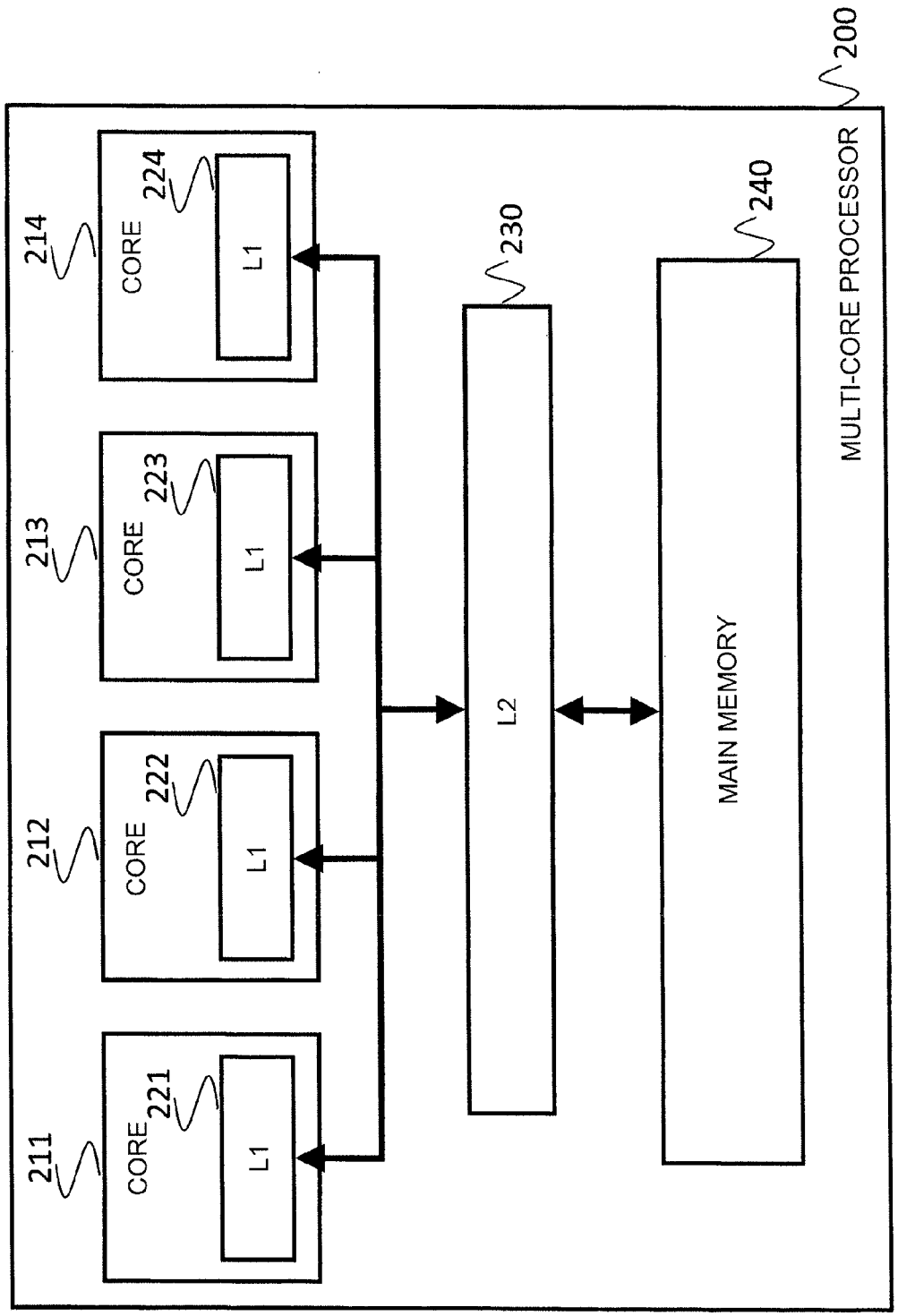
FIG. 9 is one example of a multi-core processor which executes the post-conversion program code.

For example, the post-conversion program is executed by a multi-core processor 200 shown in FIG. 9. The multi-core processor 200 includes four cores 211~214, L1 cache memories 221~224 accessible by each core 211~214 only, L2 cache memory 230 commonly accessible by four cores 211~214, a main memory 240 commonly accessible by four cores 211~214. As to the L1 cache memories 221~224, in comparison with the L2 cache memory 230 and the main memory 240, read/write processing of data can be executed quickly but capacity is smaller. As to the L2 cache memory 230, in comparison with the main memory 240, read/write processing of data can be executed quickly but capacity is smaller. In this architecture, in order to maintain cache-coherency, address is changed/controlled by pointer.

A thread is a processing unit of the multi-core processor 200. By the program code, it may be statistically determined that the thread is executed by which core 211~214. Alternatively, during executing the program code, it may be dynamically determined that the thread is executed by which core 211~214.

In this architecture, variables stored in the L1 cache memory 221 of a first core 211 cannot be accessed by other (second, third, fourth) cores 212~214. Accordingly, when the first core 211 changes (updates) variables stored in the L1 cache memory 221, other cores 212~214 cannot recognize change of variables, and uses previous variables (old data) before change by the first core 211. This problem occurs in not only the L1 cache memories 221~224 but also a status that contents of one memory can be accessed by a specified core only in each memory hierarchy.

Accordingly, variables changed by the first core 211 is written back to the L2 cache memory 230 and the main memory 240 (both accessible by other cores 212~214) before other cores 212~214 process the variables. Then, variables stored in the L1 cache memory 221 by the first core 211 are invalidated. In this way, cache-coherency is maintained.

Figure 10:
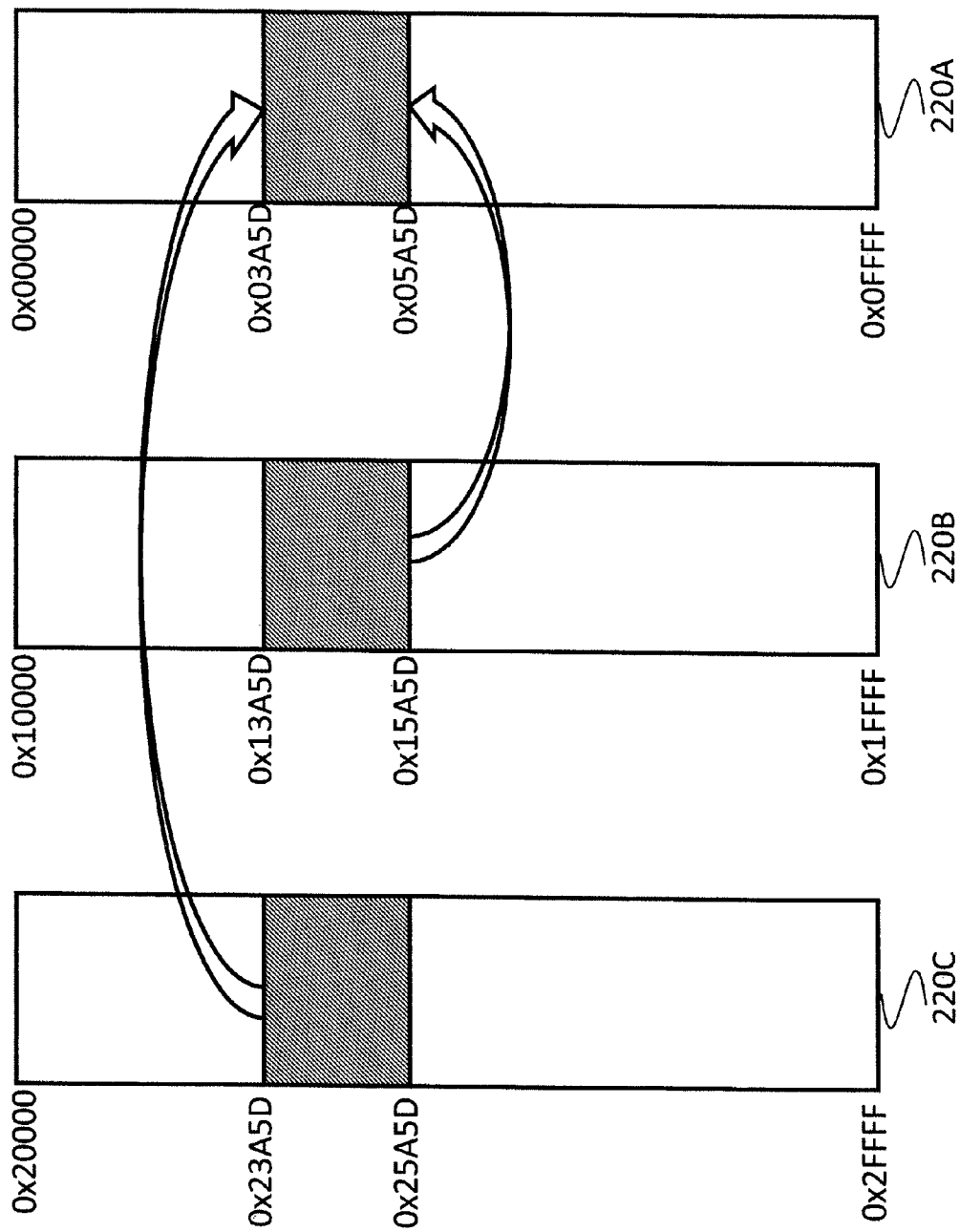
FIG. 10 is a schematic diagram showing relationship between access property and memory map.

In memory-map method shown in FIG. 10, four bits of higher order of address represents an access property. If the four bits of higher order of address is "2", variables stored at the address represent a first access property. If the four bits of higher order of address is "1", variables stored at the address represent a second access property. If the four bits of higher order of address is "0", variables stored at the address represent a third access property. Actual variables (data) exist on a memory map 220A. Memory maps 220B and 220C are virtual regions.

As to API to change the access property, a pointer (address) is input, and a pointer (address) after changing the access property is output. By changing four bits of higher order of the pointer (address) inputted, API can change the access property. Furthermore, in case of changing the access property, API invalidates variables on the L1 cache memory. In this way, coherency of variables stored on the L1 cache memory and L2 cache memory can be maintained. As another method for maintaining coherency, each variable may have an identifier representing the access property.

The post-conversion program code may be executed by architecture except for the multi-core processor shown in FIG. 9. The architecture may include L1 cache memories 221~224 without L2 cache memory 230. The architecture may include L3 cache memory. The L3 cache memory can be accessed by all cores 211~214, and operates slower than the L2 cache memory and quicker than the main memory 240. Capacity of the L3 cache memory is larger than the L2 cache memory and smaller than the main memory 240.

The architecture may include a memory having the larger number of hierarchies of memory. The architecture may be a component accessed by not all cores 211~214 but a predetermined core only. The architecture may include a scratch pad memory. The architecture may be a component which variables stored in the L1 cache memory (integrated in some core) can be accessed by another core.

The architecture may have special instruction to maintain cache-coherency. This instruction is, for example, "coherence" to automatically write back data to a lower memory hierarchy by indicating address. This instruction may be called using system call by a programmer. The architecture may include hardware to control cache-coherency.

The post-conversion program code (converted by the program conversion apparatus 100) is compiled by a compiler apparatus, and executed by the multi-core processor 200. In case of executing the post-conversion program code, the multi-core processor 200 changes an access property of variables using the route-pointer. As a result, memory-optimization can be realized.

Figure 11:
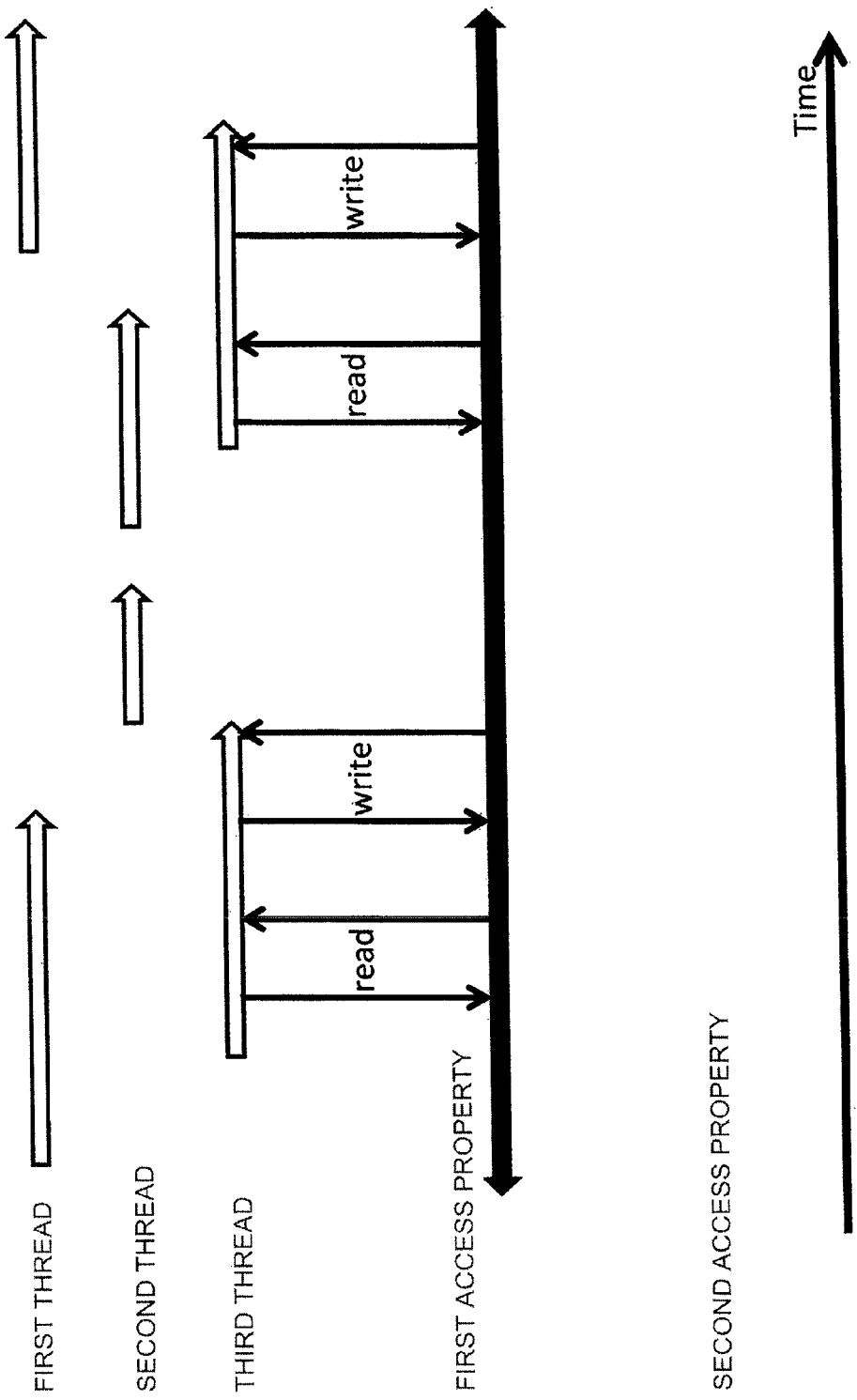
FIG. 11 is a schematic diagram showing a first transition of access property of route-pointer.
Figure 12:
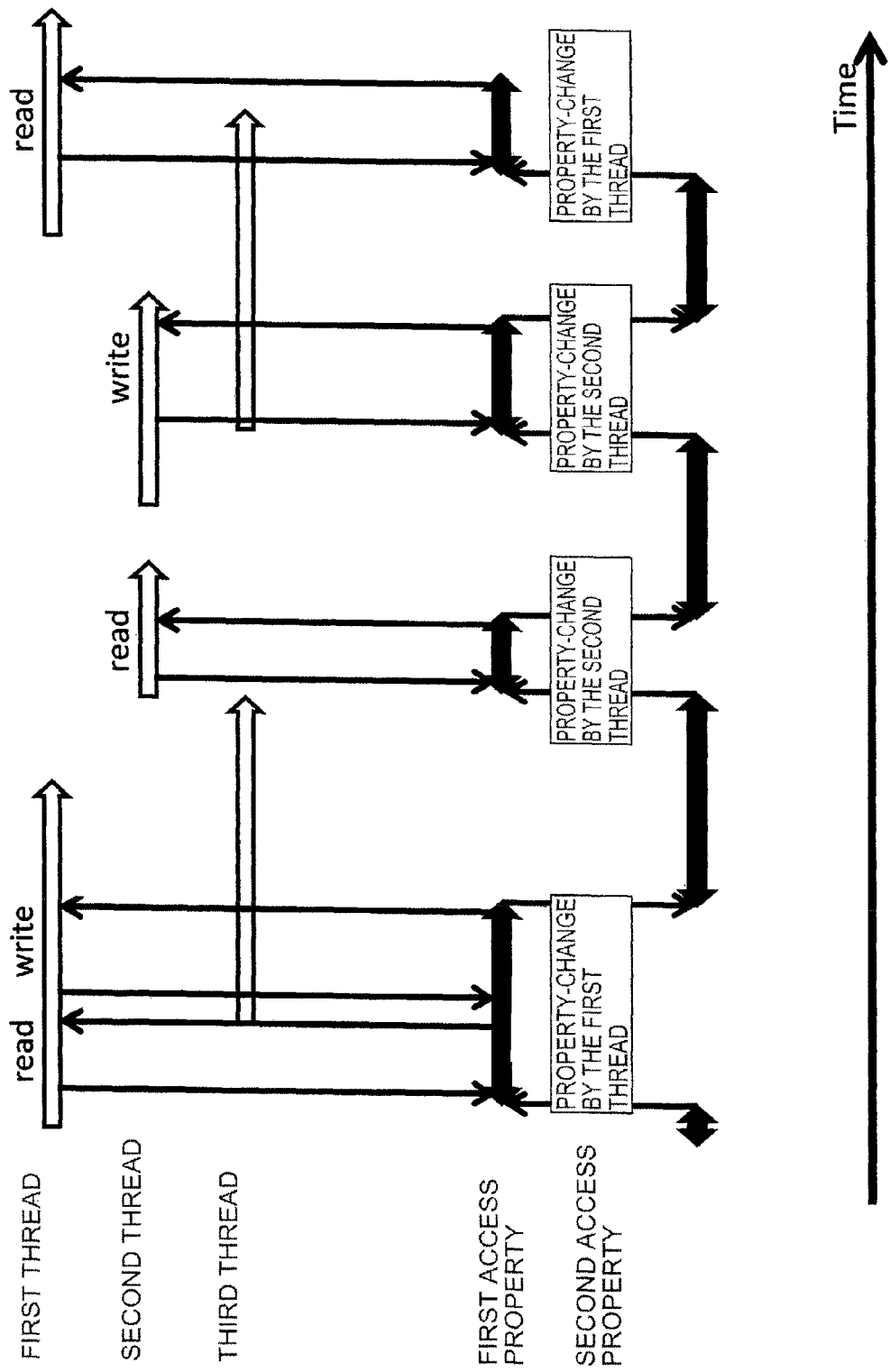
FIG. 12 is a schematic diagram showing a second transition of access property of route-pointer.
Figure 13:
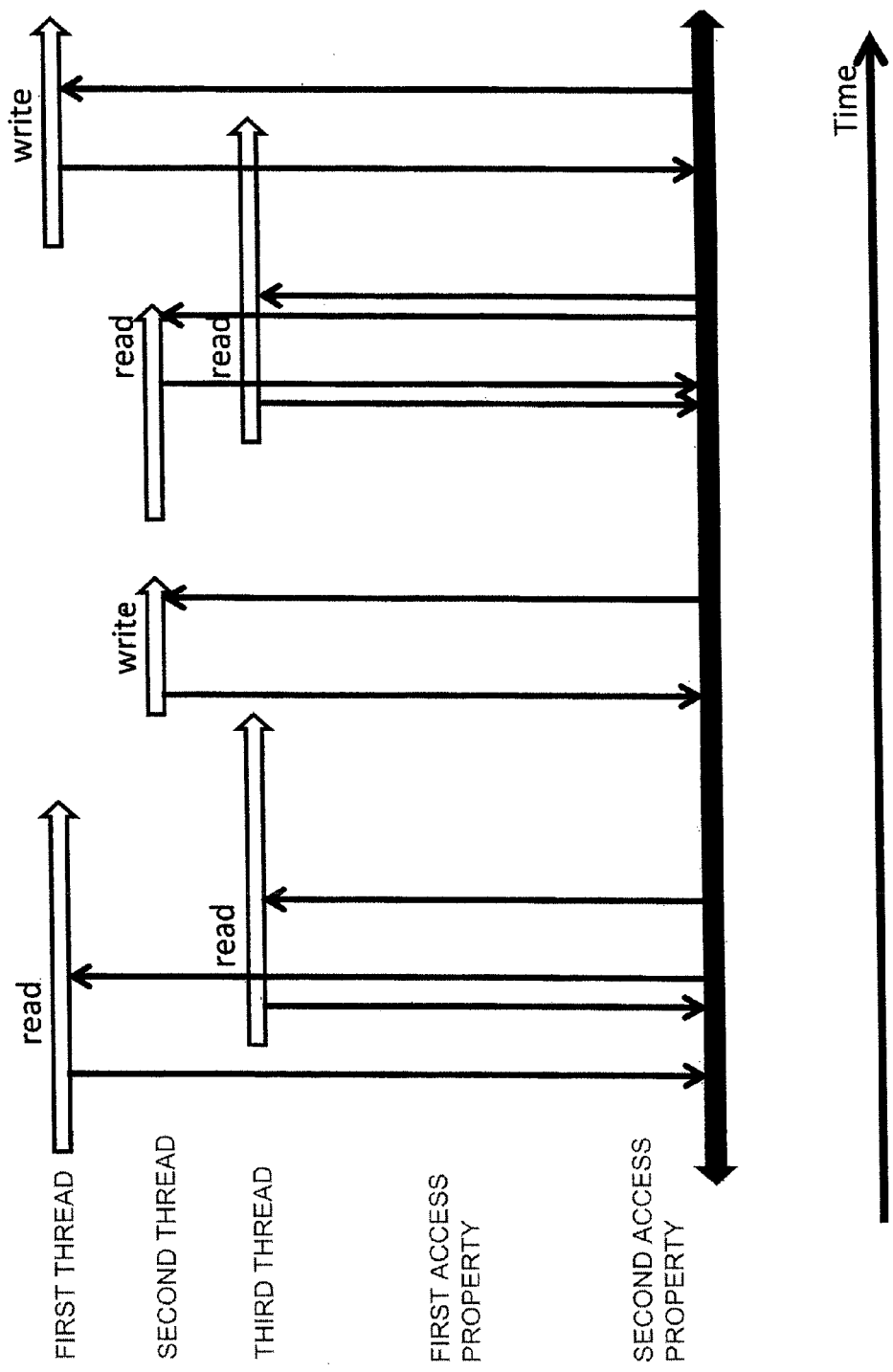
FIG. 13 is a schematic diagram showing a third transition of access property of route-pointer.

FIGS. 11, 12 and 13 show an execution period of each thread, and transition of a route-pointer (variable) and an access property. In FIGS. 11, 12 and 13, a white arrow represents a period while each thread is in an execution state. A period without the white arrow represents that the thread is not in an execution state. When execution of the thread is completed, or when the thread is synchronized with another thread, the thread becomes a state except for the execution state.

A black arrow represents a period while the route-pointer has a first access property or a second access property. When the route-pointer has the first access property, variables included in the member structure indicated by the route-pointer can be stored in the L1 cache memories 221~224, the L2 cache memory 230 and the main memory 240 (accessible by one core executing some thread only). When the route-pointer has the second access property, variables included in the member structure indicated by the route-pointer can be stored in the L2 cache memory 230 and the main memory 240 (accessible by at least one core executing each thread). In FIGS. 11, 12 and 13, a period of black arrow at the right side of "FIRST ACCESS PROPERTY" represents that the route-pointer has the first access property. A period of black arrow at the right side of "SECOND ACCESS PROPERTY" represents that the route-pointer has the second access property.

An arrow connecting the white arrow (representing an execution period of thread) and the black arrow (representing an access property of route-pointer) represents that a core to execute the thread accesses (read or write) variables. In FIG. 11, as to "read" described between two arrows along up and down directions, it represents that the core to execute the thread reads variables. As to "write" described between two arrows along up and down directions, it represents that the core to execute the thread writes variables.

In FIG. 12, as to an arrow connecting the black arrow of the first access property and the black arrow of the second access property, it represents that the access property of the route-pointer is changed.

In FIG. 11, an access property of a route-pointer is shown when a core to execute the third thread only accesses members (variables) of a member structure indicated by the route-pointer. The members of the member structure (indicated by the route-pointer) are not accessed by cores to execute threads except for the third thread. Accordingly, even if the member structure is continuously stored in the L1 cache memory (integrated in a core to execute the third thread), problem related with cache-coherency does not occur.

In this case, the access property of the route-pointer is always set as the first access property. As to the first access property, a core to execute the third thread can access the L1 cache memories 221~224, the L2 cache memory 230 and the main memory 240. Accordingly, the core can process by accessing the L1 cache memories 221~224 having the highest processing speed. As a result, performance of application improves.

In FIG. 12, an access property of a route-pointer is shown when a core to execute the first thread and a core to execute the second thread accesses members (variables) of a member structure indicated by the route-pointer. As to the members of the member structure, a period to access by the core to execute the first thread does not overlap a period to access by the core to execute the second thread. In this example of FIG. 12, a problem related with cache-coherency may occur. However, this problem is avoided by changing the access property of the route-pointer.

When the core to execute the first thread begins to access, or when the core to execute the second thread begins to access, the access property of the route-pointer is changed from the second access property (accessible by the core to execute the first thread and the core to execute the second thread) to the first access property (accessible by the core to execute one of the first thread and the second thread). Accordingly, the core can process by accessing the L1 cache memories 221~224 having the highest processing speed. As a result, performance of application improves.

After the core to execute the first thread has accessed, or after the core to execute the second thread has accessed, the access property of the route-pointer is changed from the first access property (accessible by the core to execute one of the first thread and the second thread) to the second access property (accessible by the core to execute the first thread and the core to execute the second thread). By this processing, even if a member structure indicated by the route-pointer is stored in the L1 cache memories 221~224, the second access property does not permit storing the member structure in the L1 cache memories 221~224. In this case, the member structure is written back to the L2 cache memory 230 and the main memory 240. Accordingly, a problem related with cache-coherency is avoided, and the problem does not occur in the application.

In FIG. 14, "memchange_mem2tomem1 (array, (sizeof (int)*100))" is a code (API) to change the access property of the route-pointer (array) from the second access property to the first access property. "array" is a pointer to indicate a head element of alignment "array". "memchange_mem1tomem2 (array, (sizeof(int)*100))" is a code (API) to change the access property of the route-pointer (array) from the first access property to the second access property. A method for changing the access property is not limited to change of the access property using API. For example, by using a system call, an instruction to change the access property equipped with hardware may be directly utilized.

In FIG. 13, an access property of a route-pointer is shown, when a core to execute the first thread, a core to execute the second thread and a core to execute the third thread accesses members (variables) of a member structure indicated by the route-pointer. As to the members of the member structure, a period to access by the core to execute one thread overlaps a period to access by the core to execute another thread.

Accordingly, without change of the access property of the route-pointer, the second access property (accessible by the core to execute the first thread, the core to execute the second thread and the core to execute the third thread) is constantly set. In this case, the member structure is stored in the L2 cache memory 230 accessible by all cores. Accordingly, a problem related with cache-coherency is avoided, and the problem does not occur in the application.

Furthermore, read processing is only executed (write processing is not executed) in the first thread, the second thread and the third thread, the access property of the route-pointer may be set as a third access property. As to the third access property, read processing is only permitted, and the member structure is stored in the L1 cache memory 221~224, the L2 cache memory 230 and the main memory 240. By using the third access property, in the example of FIG. 13, each core can process by accessing the L1 cache memories 221~224 during read processing. In this case, variables stored in the L1 cache memories 221~224 are not over-written (updated), and the cache-coherency is maintained. Accordingly, the problem does not occur in the application, and performance of the application improves by using the L1 cache memories 221~224.

Figure 15A:
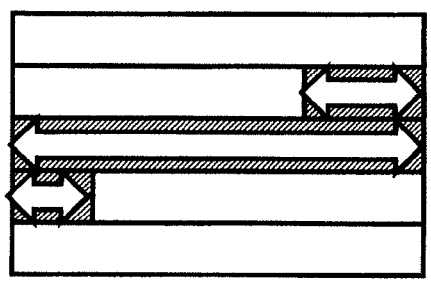
FIGS. 15A and 15B are examples of a scratch pad memory and a cache memory.
Figure 15B:
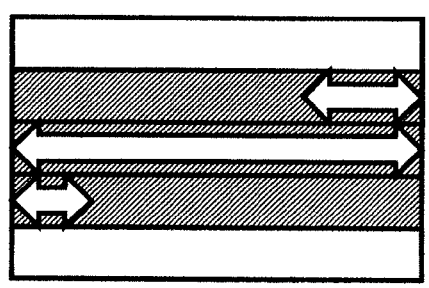

FIGS. 15A and 15B show a member structure stored in a scratch pad memory and a cache memory. A white arrow represents members of the member structure to be written (updated) into the memory. An oblique line part represents data to be actually written into the memory.

As to the scratch pad memory, size of data to be written (updated) is equal to size of data to be actually written into the memory. As to the cache memory, in comparison with size of data to be written (updated), size of data to be actually written into the memory is larger.

As to the cache memory, data is managed by unit of line. In FIG. 15B, each block of the cache memory corresponds to one line. When a particular data is written into the cache memory, all data in a line including the particular data is written simultaneously.

The access property is set by unit of at least one line (Hereinafter, this line is called a memory unit). If a member structure having the first access property and a member structure having the second access property are stored together in one memory unit, in order to avoid problem of cache-coherency, the second access property is set to all data stored in this line (the one memory unit). Accordingly, the L1 cache memory having the highest processing speed cannot be used.

On the other hand, as to the post-conversion program, variables having the same access pattern are included in one member structure. The member structure is indicated by a route-pointer. The route-pointer has one access property. When the post-conversion program is executed, the variables included in the member structure are stored in a continuous region of the memory. Accordingly, in a region to store variables of one of the first member structure and the second member structure, variables of the other of the first member structure and the second member structure are not stored. In this way, it is suppressed that a member structure having the first access property and a member structure having the second access property are stored together in one memory unit. As a result, the L1 cache memory having the highest processing speed can be effectively used.

As to a memory unit to store a member structure having some access property, the post-conversion program may include a code to control not to store a member structure having another access property. In this case, it is more accurately suppressed that a member structure having the first access property and a member structure having the second access property are stored together in one memory unit. As a result, the L1 cache memory having the highest processing speed can be effectively used.

When a member structure is stored in the memory, the member structure is stored by aligning with a head of a memory unit to which an access property of the member structure is set. In this case, it is suppressed that a member structure having the first access property and a member structure having the second access property are stored together in one memory unit. As a result, the L1 cache memory having the highest processing speed can be effectively used.

FIGS. 16A and 16B show alignment of "array[100]". In FIG. 16A, each block in the cache memory corresponds to one line, and a white arrow represents a memory region of a member structure "array". The lower part of FIG. 16A shows a memory region "array[100]" before alignment. The upper part of FIG. 16A shows a memory region "array[100]" after alignment. In FIG. 16B, "align(array)" represents a code (API) to execute alignment of the member structure "array".

The pre-conversion program may further include a code to execute alignment of the member structure.

After alignment, a head of memory regions of "array [100]" is equal to an address of a head of the line. In the memory regions, padding (null data) is added to a memory region not storing "array[100]". In this way, by aligning member structures, it is suppressed that variables of another access pattern are stored into a memory unit to store the member structures.

Furthermore, except for a method for preparing API (align) to execute alignment, by counting the number of bytes of line, regions of memory units may be secured for each variable from the beginning. Briefly, alignment may be always executed when variables are stored into the memory.

As to the program conversion apparatus 100 of the first embodiment, usage capacity of the memory by the processor can be reduced. Some architecture or some OS automatically executes alignment. In this case, even if variables having very small size are declared, particular data and another data are not stored on the same line. As a result, error of application caused by memory hierarchy is avoided, but the usage capacity of the memory becomes large.

On the other hand, the post-conversion program includes a member structure having variables (members) of the same access pattern. Briefly, the several small variables are collected as one group. Furthermore, alignment is executed for each member structure. As a result, extra occupation of the memory to store the member structure is suppressed.

Furthermore, as to the program conversion apparatus 100 of the first embodiment, energy consumption can be reduced. While data is stored in the cache memory, a processor (CPU) executes operation processing of data by accessing not a lower level memory but the cache memory.

In the post-conversion program, by switching the access property for each route-pointer, a usage efficiency of the cache memory improves, and a hit ratio of data stored in the cache memory rises. Accordingly, access to a lower level memory of large capacity (energy consumption is large) is suppressed. As a result, the energy consumption of entire application can be reduced, and a heat occurred from the processor at operation time can be lowered.

For example, the program conversion apparatus 100 can be realized using a general purpose computer as a basic hardware. Briefly, as to the input unit 110, the decision unit 120, the conversion unit 130 and the output unit 140, they can be realized by executing a program with a processor (installed onto the general purpose computer). Furthermore, as to only the decision unit 120 and the conversion unit 130, they can be realized by executing a program with the processor. In this case, the program conversion apparatus 100 may be realized by previously installing the program onto the computer.

Furthermore, the program may be previously stored into a computer-readable medium. In this case, the program conversion apparatus 100 can be realized by suitably installing the program from the computer readable medium to the computer.

The computer readable medium may be, for example, a magnetic disk, a flexible disk, a hard disk, an optical disk (e.g., CD-ROM, CD-R, CD-RW, DVD-RAM, DVD-R), an optical magnetic disk (e.g., MD). However, any computer readable medium, which is configured to store a computer program for causing the computer to perform the processing described above, may be used.

Furthermore, based on an indication of the program installed from a memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for converting a first program code to a second program code, the first program code including a plurality of variables, the second program code being executed by a multi-core processor of the apparatus including a plurality of cores, comprising:
    a decision unit being executed by the processor of the apparatus, configured to decide an access pattern of each variable by the multi-core processor; and
    a conversion unit being executed by the processor, configured to convert the first program code to the second program code including a plurality of threads, each thread being executed by one of the plurality of cores,
    wherein the second program code includes
        (a) a first member structure including variables decided as a first access pattern,
        (b) a first route-pointer indicating the first member structure, the first route-pointer having a first access property representing accessibility by a core to execute a first thread,
        (c) a second member structure including variables decided as a second access pattern,
        (d) a second route-pointer indicating the second member structure, the second route-pointer having a second access property representing accessibility by the core to execute the first thread and a core to execute a second thread.

2. The apparatus according to claim 1,
    wherein the second program code further includes a code not to overlap a first memory unit and a second memory unit in a plurality of memory units of a memory equipped with the multi-core processor, the first memory unit storing the first member structure, the second memory unit storing the second member structure.

3. The apparatus according to claim 1, further comprising:
an input unit configured to input the first program code and profile information representing the number of accesses of each variable by the multi-core processor,
wherein the decision unit decides the access pattern of each variable using the profile information.

4. The apparatus according to claim 1,
wherein the decision unit decides a variable to be updated by a core to execute the first thread as the variable accessed by the first access pattern, decides a variable to be updated by the core to execute the first thread and a core to execute the second thread as the variable accessed by the second access pattern, and decides a variable to be updated by none of the plurality of cores as the variable accessed by a third access pattern.

5. The apparatus according to claim 1,
wherein the second program code further includes a code to change the second access property to an access property representing accessibility by a core to execute the first thread in a memory access period of the first thread, and a code to change the second access property to an access property representing accessibility by a core to execute the second thread in a memory access period of the second thread.

6. A non-transitory computer readable medium storing a computer program for causing a computer to perform a method for converting a first program code to a second program code, the first program code including a plurality of variables, the second program code being executed by a multi-core processor including a plurality of cores, the method comprising:
deciding an access pattern of each variable by the multi-core processor; and
converting the first program code to the second program code including a plurality of threads, each thread being executed by one of the plurality of cores,
wherein the second program code includes
(a) a first member structure including variables decided as a first access pattern,
(b) a first route-pointer indicating the first member structure, the first route-pointer having a first access property representing accessibility by a core to execute a first thread,
(c) a second member structure including variables decided as a second access pattern,
(d) a second route-pointer indicating the second member structure, the second route-pointer having a second access property representing accessibility by the core to execute the first thread and a core to execute a second thread.

7. The non-transitory computer readable medium according to claim 6,
wherein the second program code further includes a code not to overlap a first memory unit and a second memory unit in a plurality of memory units of a memory equipped with the mufti-core processor, the first memory unit storing the first member structure, the second memory unit storing the second member structure.

8. The non-transitory computer readable medium according to claim 6, the method further comprising:
inputting the first program code and profile information representing the number of accesses of each variable by the multi-core processor;
wherein the deciding comprises
deciding the access pattern of each variable using the profile information.

9. The non-transitory computer readable medium according to claim 6,
wherein the deciding comprises
deciding a variable to be updated by a core to execute the first thread as the variable accessed by the first access pattern;
deciding a variable to be updated by the core to execute the first thread and a core to execute the second thread as the variable accessed by the second access pattern; and
deciding a variable to be updated by none of the plurality of cores as the variable accessed by a third access pattern.

10. The non-transitory computer readable medium according to claim 6,
wherein the second program code further includes a code to change the second access property to an access property representing accessibility by a core to execute the first thread in a memory access period of the first thread, and a code to change the second access property to an access property representing accessibility by a core to execute the second thread in a memory access period of the second thread.

11. A method for converting a first program code to a second program code, the first program code including a plurality of variables, the second program code being executed by a multi-core processor including a plurality of cores, comprising:
deciding an access pattern of each variable by the multi-core processor; and
converting the first program code to the second program code including a plurality of threads, each thread being executed by one of the plurality of cores,
wherein the second program code includes
(a) a first member structure including variables decided as a first access pattern,
(b) a first route-pointer indicating the first member structure, the first route-pointer having a first access property representing accessibility by a core to execute a first thread,
(c) a second member structure including variables decided as a second access pattern, and
(d) a second route-pointer indicating the second member structure, the second route-pointer having a second access property representing accessibility by the core to execute the first thread and a core to execute a second thread.

12. The method according to claim 11,
wherein the second program code further includes a code not to overlap a first memory unit and a second memory unit in a plurality of memory units of a memory equipped with the multi-core processor, the first memory unit storing the first member structure, the second memory unit storing the second member structure.

13. The method according to claim 11, further comprising:
inputting the first program code and profile information representing the number of accesses of each variable by the multi-core processor;
wherein the deciding comprises
deciding the access pattern of each variable using the profile information.

14. The method according to claim 11,
wherein the deciding comprises
deciding a variable to be updated by a core to execute the first thread as the variable accessed by the first access pattern;
deciding a variable to be updated by the core to execute the first thread and a core to execute the second thread as the variable accessed by the second access pattern; and deciding a variable to be updated by none of the plurality of cores as the variable accessed by a third access pattern.

15. The method according to claim 11,
wherein the second program code further includes a code to change the second access property to an access property representing accessibility by a core to execute the first thread in a memory access period of the first thread, and a code to change the second access property to an access property representing accessibility by a core to execute the second thread in a memory access period of the second thread.

\* \* \* \* \*